United States Patent
He et al.

(10) Patent No.: US 9,358,684 B1
(45) Date of Patent: Jun. 7, 2016

(54) WIRELESS TRANSMISSION DEVICE AND ROBOT ARM USING THE SAME

(71) Applicant: MERRY ELECTRONICS CO., LTD., Taichung (TW)

(72) Inventors: Tong-Kun He, Taichung (TW); Wei-Chi Chang, Taichung (TW)

(73) Assignee: MERRY ELECTRONICS CO., LTD., Taichung (TW)

( * ) Notice: Subject to any disclaimer, the term of this patent is extended or adjusted under 35 U.S.C. 154(b) by 0 days.

(21) Appl. No.: 14/624,888

(22) Filed: Feb. 18, 2015

(51) Int. Cl.
| | |
|---|---|
| B25J 9/10 | (2006.01) |
| B25J 13/00 | (2006.01) |
| B25J 9/12 | (2006.01) |
| H02J 5/00 | (2016.01) |
| H01Q 7/06 | (2006.01) |
| H04B 1/40 | (2015.01) |

(52) U.S. Cl.
CPC ............... B25J 9/1045 (2013.01); B25J 9/126 (2013.01); B25J 13/006 (2013.01); H01Q 7/06 (2013.01); H02J 5/005 (2013.01); H04B 1/40 (2013.01); Y10S 901/02 (2013.01)

(58) Field of Classification Search
CPC .......... B25J 9/1045; B25J 9/126; B25J 9/161; B25J 9/1692; B25J 9/1674; H04M 1/0214; H04B 1/3833
USPC .................. 455/90.1; 700/250, 254, 256, 264
See application file for complete search history.

(56) References Cited

U.S. PATENT DOCUMENTS

| | | | | |
|---|---|---|---|---|
| 4,223,313 | A * | 9/1980 | Chabrol | B25J 9/12 336/123 |
| 4,855,564 | A * | 8/1989 | Hawkins | B23K 26/043 219/121.63 |
| 5,672,044 | A * | 9/1997 | Lemelson | B66C 23/00 414/744.3 |
| 5,850,416 | A * | 12/1998 | Myer | G06F 3/147 235/385 |
| 6,057,765 | A * | 5/2000 | Jones | G08B 13/2471 340/10.1 |
| 6,232,735 | B1 * | 5/2001 | Baba | B25J 9/1689 318/567 |
| 6,259,403 | B1 * | 7/2001 | Nichols | G01C 15/004 342/357.27 |
| 6,278,210 | B1 * | 8/2001 | Fatula, Jr. | H01F 38/18 310/112 |
| 6,428,266 | B1 * | 8/2002 | Solomon | B25J 9/042 414/744.1 |
| 6,650,966 | B1 * | 11/2003 | Baba | B25J 3/04 318/567 |
| 6,976,401 | B2 * | 12/2005 | Okamoto | B25J 17/0283 74/490.02 |

(Continued)

*Primary Examiner* — Hai V Nguyen
(74) *Attorney, Agent, or Firm* — Bacon & Thomas, PLLC (57) ABSTRACT

A wireless transmission device for use in a robot arm is disclosed to include a rotating unit including a first winding and a second winding relatively rotatably arranged in a coaxial manner, and two receiver-transmitter units respectively electrically connected to the first winding and the first winding for receiving a composite signal and then generating a power signal and a control signal. Thus, the receiver-transmitter units can transmit power and data in two ways by means of an electromagnetic coupling between the first winding and the second winding, having the advantages of simple structure and no need for wiring, and allowing the robot arm using the wireless transmission device to be freely rotated through 360 degrees.

11 Claims, 5 Drawing Sheets

(56) References Cited

U.S. PATENT DOCUMENTS

| | | | | |
|---|---|---|---|---|
| 7,330,775 B2* | 2/2008 | Orita | B62D 57/032 | 318/568.11 |
| 7,375,490 B2* | 5/2008 | Furem | H02M 1/12 | 318/375 |
| 7,437,397 B1* | 10/2008 | Koudas | G06K 9/000536 | 708/422 |
| 7,463,948 B2* | 12/2008 | Orita | G05D 1/0251 | 180/168 |
| 7,499,250 B2* | 3/2009 | Zhang | H02H 1/0015 | 361/42 |
| 7,555,691 B2* | 6/2009 | Gilbert | H03M 7/30 | 708/530 |
| 7,622,884 B2* | 11/2009 | Furem | B66C 13/22 | 318/375 |
| 7,720,573 B2* | 5/2010 | Yamada | B25J 19/023 | 700/245 |
| 7,979,162 B2* | 7/2011 | Niemela | B25J 9/1612 | 318/568.11 |
| 8,010,231 B2* | 8/2011 | Sumida | G06N 3/008 | 700/253 |
| 8,027,750 B2* | 9/2011 | Orita | B25J 19/005 | 320/107 |
| 8,090,193 B2* | 1/2012 | Higaki | G06K 9/3241 | 382/103 |
| 8,131,792 B1* | 3/2012 | Koudas | G06K 9/00536 | 708/422 |
| 8,264,187 B2* | 9/2012 | Laceky | B25J 19/0029 | 318/568.11 |
| 8,265,791 B2* | 9/2012 | Song | B25J 9/1664 | 700/250 |
| 8,274,178 B2* | 9/2012 | Tucker | H01Q 7/00 | 307/104 |
| 8,396,611 B2* | 3/2013 | Phillips | G05D 1/0033 | 700/245 |
| 8,847,548 B2* | 9/2014 | Kesler | H02J 5/005 | 320/108 |
| 8,849,202 B2* | 9/2014 | Linde | H04W 80/02 | 455/41.1 |
| 8,937,408 B2* | 1/2015 | Ganem | A61B 19/2203 | 307/104 |
| 8,958,912 B2* | 2/2015 | Blumberg | B25J 9/0087 | 700/259 |
| 8,965,580 B2* | 2/2015 | Brooks | B25J 9/0087 | 345/629 |
| 8,996,175 B2* | 3/2015 | Blumberg | B25J 9/0087 | 700/259 |
| 8,996,244 B2* | 3/2015 | Summer | F41H 11/16 | 701/36 |
| 8,998,797 B2* | 4/2015 | Omori | A61B 19/2203 | 318/567 |
| 9,090,214 B2* | 7/2015 | Bernstein | B60R 11/00 | |
| 9,114,537 B2* | 8/2015 | Wise | B25J 19/0095 | |
| 9,211,920 B1* | 12/2015 | Bernstein | B62D 39/00 | |
| 9,246,749 B1* | 1/2016 | Nguyen | H04L 41/0654 | |
| 9,252,584 B2* | 2/2016 | Aldrich | H02G 11/02 | |
| 9,278,454 B2* | 3/2016 | Mimura | B25J 13/006 | |
| 9,283,682 B2* | 3/2016 | Takahashi | B25J 9/1692 | |
| 2002/0062178 A1* | 5/2002 | Takahashi | B25J 19/005 | 700/245 |
| 2002/0120362 A1* | 8/2002 | Lathan | A63F 13/00 | 700/245 |
| 2002/0173877 A1* | 11/2002 | Zweig | B25J 9/1689 | 700/245 |
| 2003/0010148 A1* | 1/2003 | Okamoto | B25J 17/0283 | 74/490.05 |
| 2004/0051499 A1* | 3/2004 | Kameda | G05B 19/19 | 320/104 |
| 2004/0148058 A1* | 7/2004 | Johannessen | B25J 13/06 | 700/245 |
| 2005/0052148 A1* | 3/2005 | Carlson | B25J 13/02 | 318/568.11 |
| 2005/0187657 A1* | 8/2005 | Hashimoto | B25J 19/00 | 700/245 |
| 2005/0244260 A1* | 11/2005 | Deplano | B25J 19/005 | 414/730 |
| 2006/0087278 A1* | 4/2006 | Furem | H02M 1/12 | 318/778 |
| 2006/0091842 A1* | 5/2006 | Nishiyama | G05B 19/4183 | 318/568.11 |
| 2006/0122730 A1* | 6/2006 | Niemela | B25J 9/1612 | 700/245 |
| 2007/0244610 A1* | 10/2007 | Ozick | A47L 5/30 | 701/23 |
| 2007/0247767 A1* | 10/2007 | Zhang | H02H 1/0015 | 361/42 |
| 2007/0276538 A1* | 11/2007 | Kjellsson | B25J 19/0025 | 700/245 |
| 2007/0293987 A1* | 12/2007 | Yamada | B25J 13/06 | 700/245 |
| 2008/0212344 A1* | 9/2008 | Furem | B66C 13/22 | 363/46 |
| 2008/0267112 A1* | 10/2008 | Lucidarme | H04B 5/02 | 370/315 |
| 2009/0014242 A1* | 1/2009 | Tang | H04Q 9/00 | 182/241 |
| 2009/0204261 A1* | 8/2009 | Strand | B25J 9/1656 | 700/264 |
| 2009/0271038 A1* | 10/2009 | Song | B25J 9/1664 | 700/259 |
| 2010/0017029 A1* | 1/2010 | Graf | B25J 19/00 | 700/245 |
| 2010/0077810 A1* | 4/2010 | De Franceschi | G01G 15/00 | 70/283.1 |
| 2010/0079099 A1* | 4/2010 | Katsuki | G05B 23/0256 | 318/565 |
| 2010/0181783 A1* | 7/2010 | Lavrencic | D06F 37/42 | 292/341.16 |
| 2010/0264748 A1* | 10/2010 | Tucker | H01Q 7/00 | 307/104 |
| 2011/0208353 A1* | 8/2011 | Kjellsson | B25J 19/0025 | 700/245 |
| 2011/0218677 A1* | 9/2011 | Jinno | B25J 13/00 | 700/264 |
| 2011/0313568 A1* | 12/2011 | Blackwell | B25J 5/007 | 700/245 |
| 2012/0032522 A1* | 2/2012 | Schatz | H02J 5/005 | 307/104 |
| 2012/0139355 A1* | 6/2012 | Ganem | A61B 19/2203 | 307/104 |
| 2012/0259461 A1* | 10/2012 | Yang | B25J 15/0206 | 700/245 |
| 2013/0013268 A1* | 1/2013 | Woolf | G06F 17/50 | 703/1 |
| 2013/0046438 A1* | 2/2013 | Summer | A61G 5/10 | 701/36 |
| 2013/0090764 A1* | 4/2013 | Summer | F41H 11/16 | 700/260 |
| 2013/0147425 A1* | 6/2013 | Chang | H02J 7/32 | 320/108 |
| 2013/0211597 A1* | 8/2013 | Sommerville | B25J 9/1602 | 700/264 |
| 2013/0261867 A1* | 10/2013 | Burnett | G05D 1/0272 | 701/23 |
| 2013/0320773 A1* | 12/2013 | Schatz | H02J 5/005 | 307/104 |
| 2014/0000982 A1* | 1/2014 | Barnhill | A01G 23/0955 | 182/133 |
| 2014/0024498 A1* | 1/2014 | Lin | A63B 5/205 | 482/8 |
| 2014/0360832 A1* | 12/2014 | Aldrich | H02G 11/02 | 191/12.2 R |
| 2015/0008761 A1* | 1/2015 | Kesler | H02J 5/005 | 307/104 |
| 2015/0012137 A1* | 1/2015 | Mimura | B25J 3/006 | 700/264 |
| 2015/0088129 A1* | 3/2015 | Ganem | A61B 19/2203 | 606/45 |
| 2015/0183114 A1* | 7/2015 | Takahashi | B25J 9/1692 | 700/253 |
| 2015/0217444 A1* | 8/2015 | Asada | B25J 5/00 | 700/258 |

(56) References Cited

U.S. PATENT DOCUMENTS

| | | | | |
|---|---|---|---|---|
| 2015/0217450 A1* | 8/2015 | Huang | ............... | B25J 9/1671 700/259 |
| 2015/0237918 A1* | 8/2015 | Liu | ............... | A24F 47/008 131/328 |
| 2015/0273696 A1* | 10/2015 | Nam | ............... | B25J 19/005 700/259 |
| 2015/0293877 A1* | 10/2015 | Liang | ............... | A61B 1/00016 710/33 |
| 2016/0084982 A1* | 3/2016 | Donderici | ............... | G01V 3/18 340/854.6 |

\* cited by examiner

WIRELESS TRANSMISSION DEVICE AND ROBOT ARM USING THE SAME

BACKGROUND OF THE INVENTION

1. Field of the Invention

The present invention relates to robot arm technology and more specifically, to a wireless transmission device that can be used as a joint in a robot arm for transmitting power and data between two sides of the joint in a wireless manner, eliminating the problem of wiring in the joint, having the advantages of simple structure, series connection applicability and free 360-degree robot arm rotation.

2. Description of the Related Art

With fast development of industrialization, human power has been gradually replaced by robot in automated manufacturing. In order to simultaneously transmit power, control signal and other sensed data signal, a robot needs a complicated arrangement of cables therein. However, arranging physical cables in a robot restricts the freedom of the motion of the arm members of the robot, limiting the rotation angle of the arm members to the range of 90 degrees or 120 degrees, and thus, the arm members of a robot cannot be freely rotated through 360 degrees. Further, arranging a large amount of cables in a robot cannot eliminate the occurrence of the poor contact or short circuit problem, lowering the reliability of durability of the robot.

US2007/0276538 discloses a robot or manipulator including a wireless power supply and a wireless communication device respectively adapted for transmitting power and data, so as to achieve non-contact transmission of power and signals. However, this patent is not designed for installation inside the robot arm, in other words, due to the differences of the transmission routes between the power and the control signal, a power transmission line and a signal transmission line are still necessarily arranged inside the robot arm with complicating layout. This design cannot resolve the problems encountered in the current robotics industries. A further improvement in this regard is needed.

SUMMARY OF THE INVENTION

The present invention has been accomplished under the circumstances in view. It is the main object of the present invention to provide a wireless transmission device, which is capable of composing a power signal and a control signal directly to a composite signal in a wireless manner by electromagnetic coupling between windings, and further decomposing the composite signal back to the power signal and the control signal in the wireless manner as well. Therefore, the complex problem of wirings is eliminated, and the transmission requirement of demanding energy and data for robot arm is met simultaneously.

To achieve this and other objects of the present invention, a wireless transmission device comprises a rotating unit and two receiver-transmitter units. The rotating unit comprises a first winding and a second winding arranged in a coaxial manner and rotatable relatively to each other. The two receiver-transmitter units are respectively electrically connected to the first winding and the second winding, and adapted for receiving a first composite signal and for further decomposing the first composite signal into a power signal and a control signal. To meet the need, these two receiver-transmitter units established a communication therebetween by using the electromagnetic coupling between the first winding and the second winding.

Thus, the invention needs no individual transmission for the power and the control signals, but instead, simply combines energy and data into a composite signal in advance. The composite signal is then transmitted to the receiver-transmitters for rectification and filtration, and is decomposed to a composite signal into a power signal and a control signal separately. Communication medium between the two receiver-transmitter units is merely the air. The electromagnetic coupling between the first winding and the second winding is used for transmitting energy and data, and therefore, no physical installation of cable or wire is needed for transmitting energy and data, and the problem of wiring is eliminated. More importantly, when the aforesaid wireless transmission device is used as a joint in a robot arm, there will be no restrictions on the free rotation of the robot arm due to the elimination of wiring problem.

Preferably, the two receiver-transmitter units are adapted to modulate the energy and data into a second composite signal, and then to transmit the second composite signal therebetween for mutual communication.

It is another object of the present invention to provide a robot arm using the aforesaid wireless transmission device, which has a simple structure and can be freely rotated through 360 degrees.

To achieve this and other objects of the present invention, a robot arm comprises a controller adapted for combining a power signal and a control signal into a composite signal and transmitting the composite signal, two arm members coupled together and rotatable relatively to each other, a drive unit adapted for driving the two arm members to rotate, and the wireless transmission device above-described. A first axle sleeve and a second axle sleeve of the rotating unit of the wireless transmission device are respectively mounted in the two arm members. Further, one receiver-transmitter unit is electrically connected to the drive unit, and adapted for providing a power signal and a control signal to the drive unit so that the drive unit can rotate the robot arms freely.

Further, the robot arm can be configured to have multiple wireless transmission devices mounted in one arm member thereof, in such a manner that the receiver-transmitter units of the wireless transmission devices are connected in series, so that the wireless transmission devices can transmit power and data sequentially, in order to simplify the data transmission route and efficiency. Further, under the condition that the drive unit has sensor means built therein, the receiver-transmitter units can directly receive sensed data from the sensor means and combine the sensed data into the second composite signal for transmission.

Other advantages and features of the present invention will be fully understood by reference to the following specification in conjunction with the accompanying drawings, in which like reference signs denote like components of structure.

DETAILED DESCRIPTION OF THE INVENTION

Figure 1:
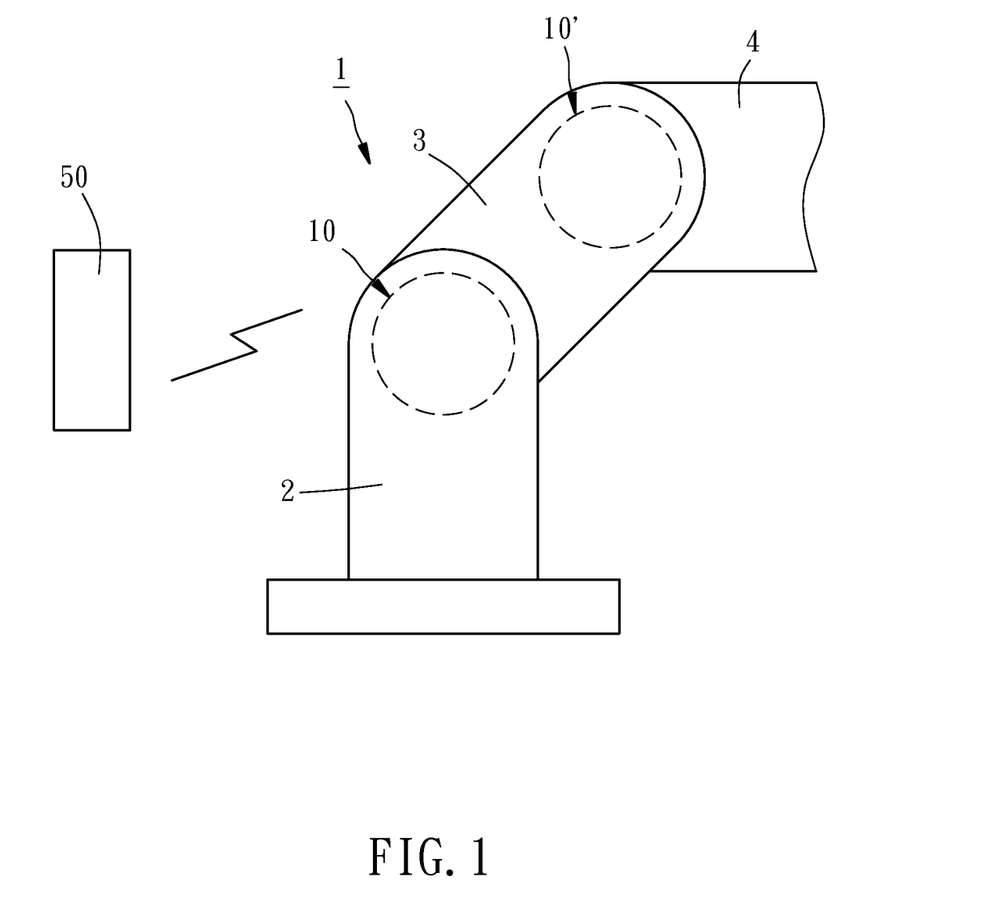
FIG. 1 is a schematic drawing illustrating the architecture of a robot arm in accordance with the present invention.
Figure 2:
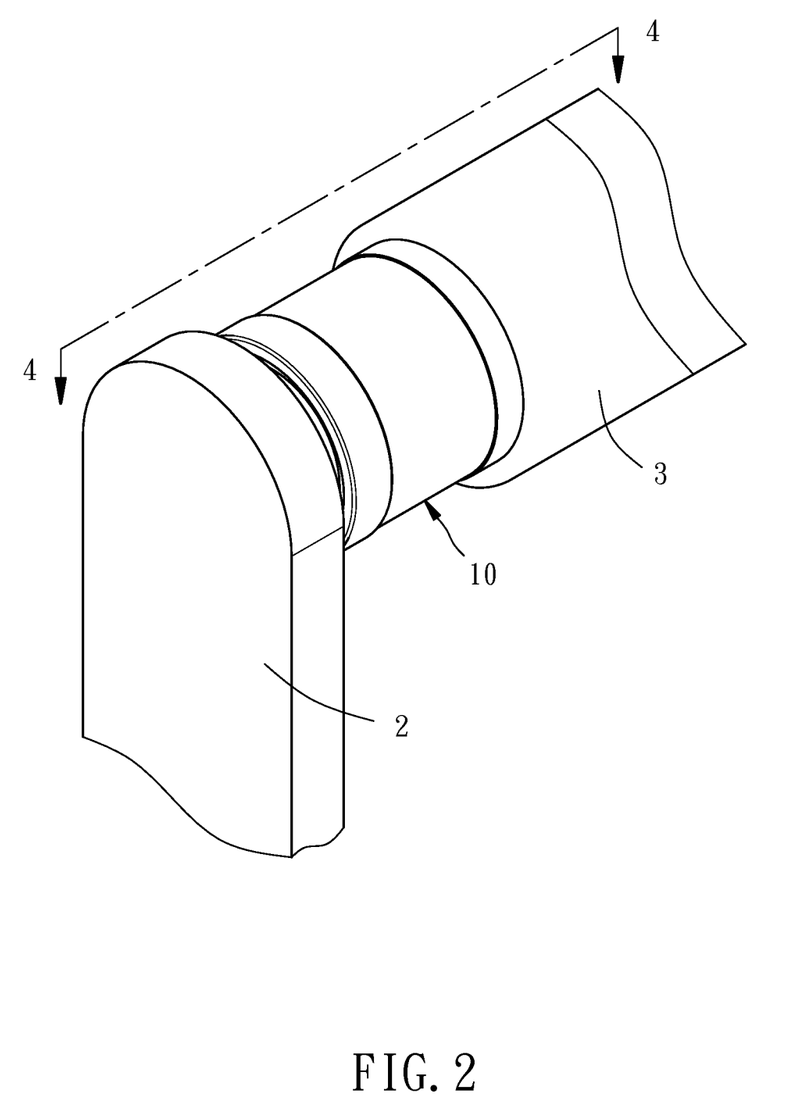
FIG. 2 is an oblique top elevational view of the present invention, illustrating the positioning of one wireless transmission device in the robot arm.

Referring to FIGS. 1 and 2, the present invention provides a robot arm 1. The robot arm 1 comprises a first arm member 2 mounted at a machine base, a second arm member 3 having one end thereof rotatably coupled to one end of the first arm member 2, a third arm member 4 rotatably coupled to an opposite end of the second arm member 3 remote from the first arm member 2, two wireless transmission devices 10, 10' mounted in the second arm member 3 and respectively connected to the first arm member 2 and the third arm member 4, and a controller 50 for generating a first composite signal composed of a power signal and a control signal and transmitting the first composite signal to the wireless transmission device 10 and/or the wireless transmission device 10'. These two wireless transmission devices 10, 10' have the same internal structure. The structure of the wireless transmission device 10 is described hereinafter.

Figure 3:
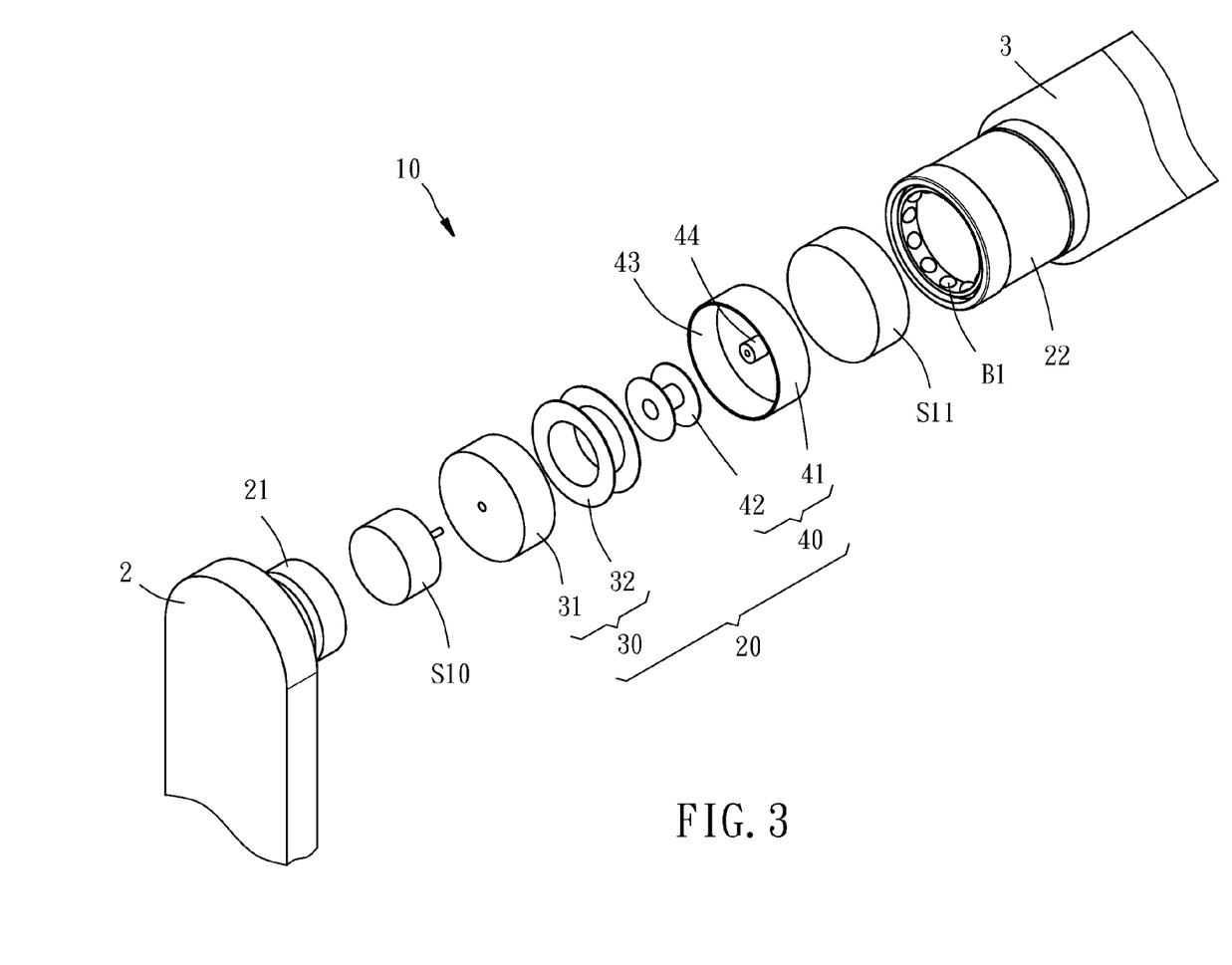
FIG. 3 is an exploded view of FIG. 3, illustrating the structural detail of the wireless transmission device.
Figure 4:
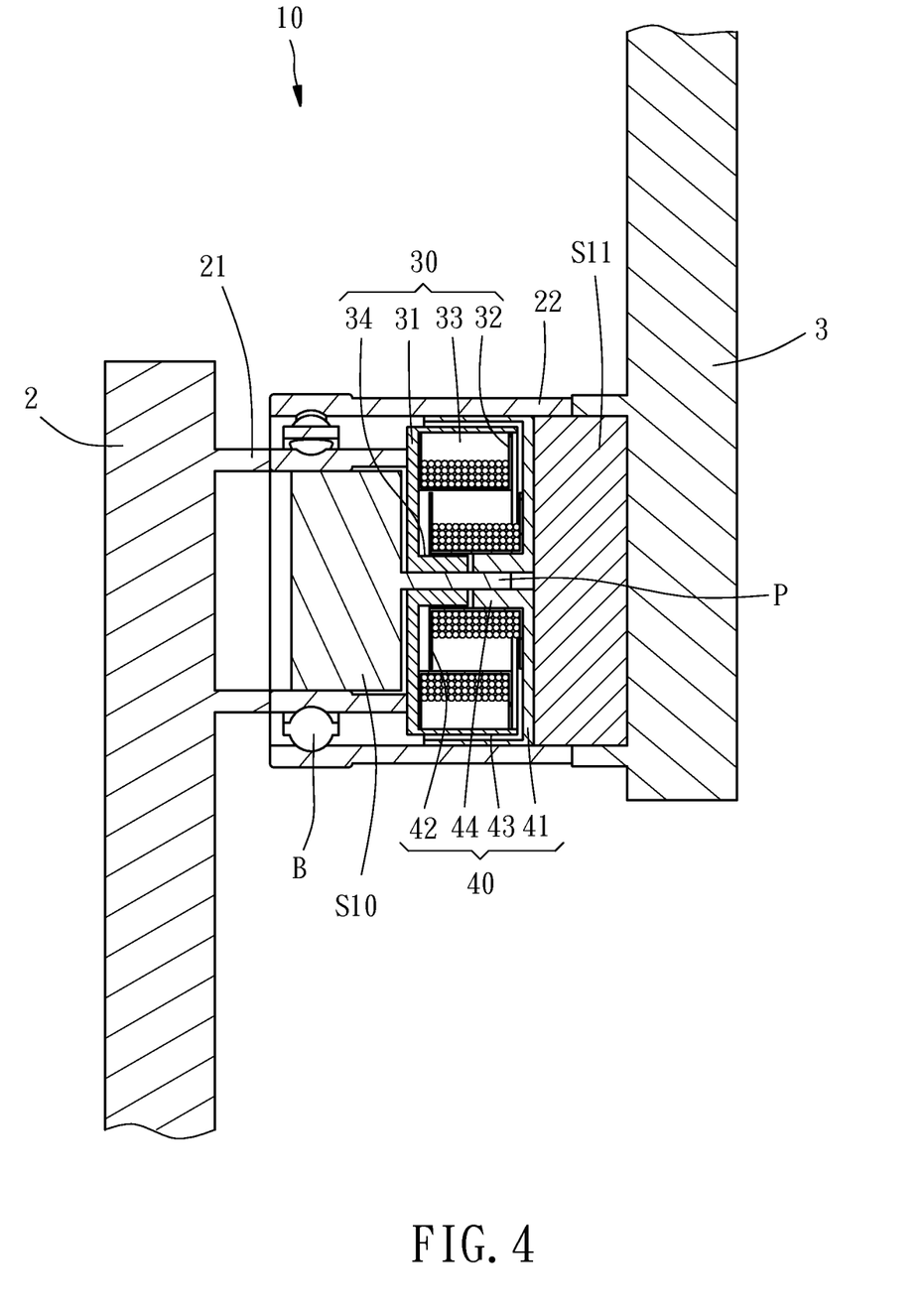
FIG. 4 is a sectional view taken along line 4-4 of FIG. 2.

Referring to FIGS. 3 and 4, the wireless transmission device 10 comprises a rotating unit 20, a first receiver-transmitter unit S10 and a second receiver-transmitter unit S11. The rotating unit 20 comprises a first axle sleeve 21 with a relatively smaller diameter and a second axle sleeve 22 with a relatively larger diameter. The first axle sleeve 21 and the second axle sleeve 22 are respectively connected to the first arm member 2 and the second arm member 3. The first axle sleeve 21 is rotatably and coaxially mounted in the second axle sleeve 22 by an axle bearing B. Further, a first winding 30 and a second winding 40 are respectively mounted in the first axle sleeve 21 and the second axle sleeve 22.

The first winding 30 comprises a first magnetic core 31 connected to an end face of the first axle sleeve 21, and a first spool 32 mounted in the first magnetic core 31. The first magnetic core 31 is shaped like a rounded cap defining therein an accommodation chamber 33, and an inner tube 34 is formed in a bottom side of the accommodation chamber 33 at the center. The first spool 32 is a double end flanged cylinder on which a lead wire is wound (see FIG. 4). Further, the first spool 32 is abutted with one end flange thereof to the inner bottom surface of the accommodation chamber 33 of the first magnetic core 31.

The second winding 40 comprises a second magnetic core 41 fixedly connected to an inside wall of the second axle sleeve 22, and a second spool 42 mounted in the second magnetic core 41. The physical structure of the second magnetic core 41 and second spool 42 is substantially similar to the physical structure of the first magnetic core 31 and first spool 32 with the exception that: the second spool 42 is directly sleeved onto the inner tube 44 of the second magnetic core 41; the inner diameter of the accommodation chamber 43 of the second magnetic core 41 is larger than the outer diameter of the first magnetic core 31 so that the accommodation chamber 43 can accommodate the first magnetic core 31; the outer diameter of the second spool 42 is smaller than the inner diameter of the first spool 32 so that the first magnetic core 31 and the second magnetic core 41 can be coaxially arranged together with the open sides of the accommodation chambers 33, 43 facing toward each other to let at least a part of the second spool 42 be received inside the first spool 32, minimizing the dimension.

The first receiver-transmitter unit S10 is positioned in the first axle sleeve 21 and electrically coupled with the first winding 30 for receiving the first composite signal from the controller 50 (see FIG. 1) and decomposing the first composite signal into a power signal and a control signal. Further, the first receiver-transmitter unit S10 comprises a pin P inserted into the inner tubes 34;44 of the magnetic cores 31;41, allowing the magnetic cores 31;41 to be rotated relative to each other. The second receiver-transmitter unit S11 is positioned in the second axle sleeve 22 and electrically coupled with the second winding 40.

The aforesaid first composite signal is a high frequency signal produced by the controller 50 by means of modulating the power signal and the control signal. After received the first composite signal, the first receiver-transmitter unit S10 runs a filtering process to separate the power signal and the control signal for output, or directly transmits the received first composite signal to the second receiver-transmitter unit S11 using the electromagnetic coupling between the first winding 30 and the second winding 40. Under this condition, the first receiver-transmitter unit S10 and the second receiver-transmitter unit S11 simply provide one-way communication.

When desiring the first receiver-transmitter unit S10 and the second receiver-transmitter unit S11 to provide mutual communication, the first and second receiver-transmitter units S10;S11 can modulate the energy and/or data to be transmitted into a second composite signal, and then send out this second composite signal using the electromagnetic coupling between the first winding 30 and the second winding 40. Thus, the second receiver-transmitter unit S11 can send the energy and data back to the first receiver-transmitter unit S10 using the electromagnetic coupling between the first winding 30 and the second winding 40. Further, the first receiver-transmitter unit S10 can also send data back to the controller 50 by wireless communication.

Because the first receiver-transmitter unit S10 and the second receiver-transmitter unit S11 directly use air as a medium for two-way transmission of power and data through the electromagnetic coupling between the first winding 30 and the second winding 40, no physical circuit is needed. Further, the first magnetic core 31 and the second magnetic core 41 form a closed magnetic circuit structure, preventing magnetic leakage and enhancing the energy transmission efficiency between the first winding 30 and second winding 40.

Figure 5:
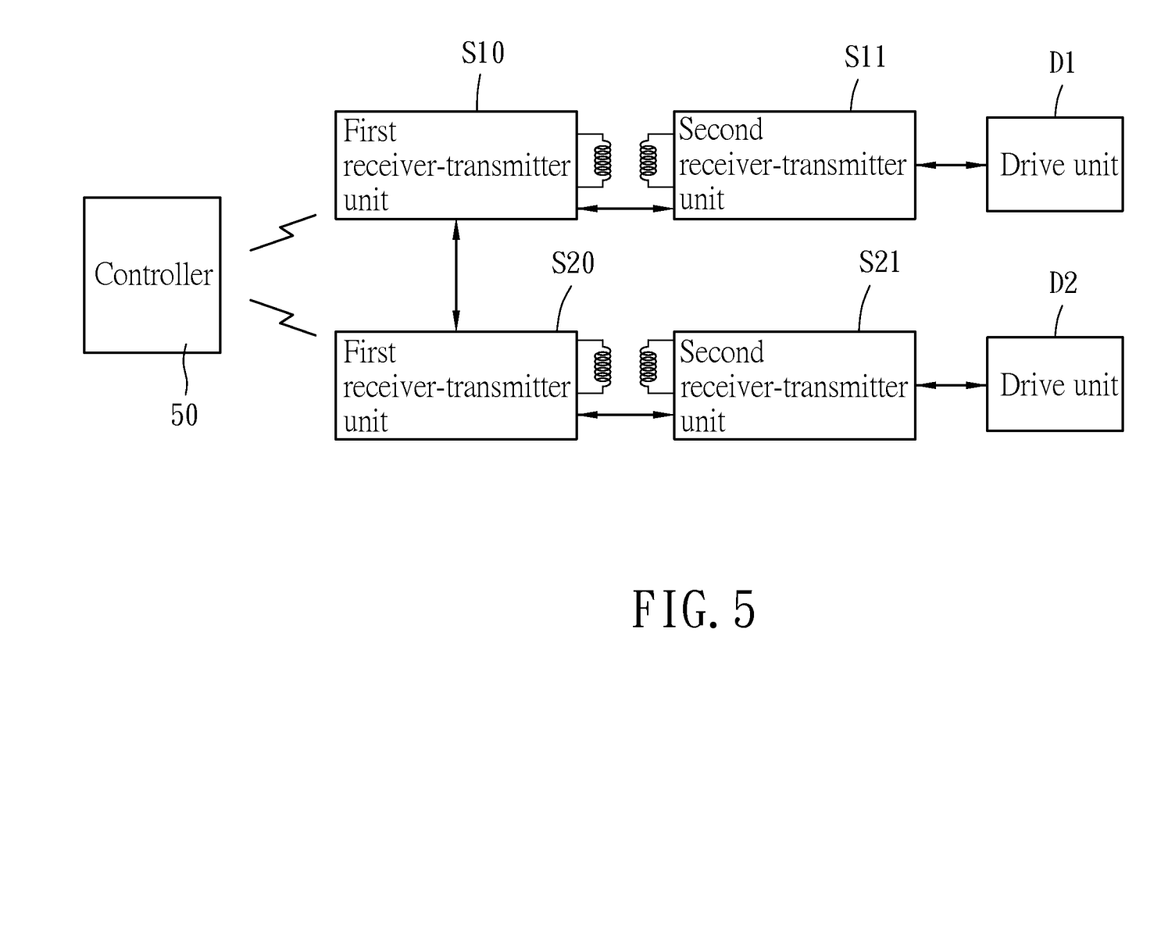
FIG. 5 is a system block diagram of the present invention.

Referring to FIG. 5, and FIG. 1 again, the aforesaid wireless transmission device 10' also comprises a first receiver-transmitter unit S20 and a second receiver-transmitter unit S21. The second receiver-transmitter units S11;S21 are respectively electrically coupled to respective drive units D1;D2, and provide a load control function. In this embodiment, the drive units D1;D2 are servers having built therein a motor, a motor driver, a controller and sensor means, and respectively adapted for driving the second arm member 3 and the third arm member 4 to work. The data sensed by the sensor means of the can be fed back by means of the second receiver-transmitter units S11;S21.

Thus, the first receiver-transmitter unit S10 and the second receiver-transmitter unit S11 can simultaneously or separately receive the first composite signal from the controller 50, and then transmit the first composite signal to the second receiver-transmitter units S11;S21 by electromagnetic coupling, enabling the second receiver-transmitter units S11;S21 to separate the first composite signal into a power signal and a control signal and then provide power to the drive units D1;D2 and control the drive units D1;D2 to drive the second arm member 3 and/or the third arm member 4 according to the instruction of the control signal.

It is to be noted that the first and second receiver-transmitter units S10;S11 can be connected in series for two-way communication. Thus, the data sensed by the sensor means of the drive units D1;D2 can be gathered together and transmitted to the first receiver-transmitter unit S10 or S20, and then sent back to the controller 50, simplifying data transmission route and efficiency. Similarly, when the wireless transmission devices 10;10' are connected in series for application, the controller 50 simply needs to transmit the composite signal to one of the first receiver-transmitter units S10;S20.

Because the wireless transmission devices 10;10' can transmit power, control signals and sensed data without through any cable, the second arm member 3 and third arm member 4 of the robot arm 1 can be rotated through 360 degrees without restriction. Further, the wireless transmission devices 10;10' can flexibly plain the power and data transmission route, therefore, the wireless transmission device can be easily applied in a variety of robot arms.

At last, it is to be noted once again, the composition components disclosed in the aforesaid embodiment are for purposes of illustration, various modifications and enhancements may be made without departing from the spirit and scope of the invention, for example, the drive unit can be electrically connected to the first receiver-transmitter unit according to actual requirements. Accordingly, the invention is not to be limited except as by the appended claims.

What is claimed is:

1. A wireless transmission device, comprising:
   a rotating unit comprising a first winding and a second winding arranged in a coaxial manner and rotatable relatively to each other; and
   two receiver-transmitter units respectively electrically connected to said first winding and said second winding, and adapted for receiving a first composite signal and for separating said first composite signal into a power signal and a control signal; said two receiver-transmitter units establishing a communication therebetween using an electromagnetic coupling between said first winding and said second winding.

2. The wireless transmission device as claimed in claim 1, wherein said rotating unit comprises a first axle sleeve and a second axle sleeve coaxially connected in series and rotatable relatively to each other, said first winding and said second winding being respectively connected to said first axle sleeve and said second axle sleeve.

3. The wireless transmission device as claimed in claim 1, wherein said first winding and said second winding each comprises a magnetic core, and a spool mounted in said magnetic core for the winding of a lead wire.

4. The wireless transmission device as claimed in claim 3, wherein each said magnetic core is shaped like a rounded cap, comprising an accommodation chamber and an inner tube located in a bottom side of said accommodation chamber at the center; each said spool is a double end flanged cylinder.

5. The wireless transmission device as claimed in claim 4, wherein the spools of said first winding and said second winding have different inner diameters; the spool having a relatively larger inner diameter is abutted with one flange of the double end flanged cylinder thereof against an inner bottom surface, and the other spool having a relatively smaller inner diameter is directly sleeved onto the inner tube of the associating said magnetic core.

6. The wireless transmission device as claimed in claim 5, wherein said magnetic cores said first winding and said second winding are arranged in a coaxial manner with the spool of smaller inner diameter relatively accommodated in the spool of larger inner diameter.

7. The wireless transmission device as claimed in claim 6, wherein one said receiver-transmitter unit comprises a pin inserted through said first magnetic core and said second magnetic core.

8. The wireless transmission device as claimed in claim 1, wherein said two receiver-transmitter units are adapted to modulate the energy and data into a second composite signal and then to transmit said second composite signal.

9. A robot arm, comprising:
   a controller adapted for combining a power signal and a control signal into a composite signal and transmitting said composite signal;
   two arm members coupled together and rotatable relatively to each other;
   a drive unit adapted for driving said two arm members to rotate; and
   a wireless transmission device as claimed in claim 1, said rotating unit of said wireless transmission device being connected between said two arm members, one said receiver-transmitter unit being electrically connected to said drive unit and adapted for providing a power signal and a control signal to said drive unit.

10. The robot arm as claimed in claim 9, further comprising a second said wireless transmission device, wherein the two said wireless transmission devices are mounted in one same said arm member, and the receiver-transmitter units of said two wireless transmission devices are electrically connected in series.

11. The robot arm as claimed in claim 9, wherein the receiver-transmitter units of said two wireless transmission devices are adapted to modulate the energy and data into a second composite signal and then to transmit said second composite signal.

* * * * *